(12) United States Patent
Güemes Cabrejas et al.

(10) Patent No.: US 8,244,314 B2
(45) Date of Patent: Aug. 14, 2012

(54) REDUCING POWER CONSUMPTION IN MOBILE NETWORKS

(75) Inventors: Inigo Güemes Cabrejas, Colmenar Viejo (ES); Miguel Arranz Arauzo, Madrid (ES); Alberto Gómez Coloma, San Sebastian Reyes (ES)

(73) Assignee: Vodafone Group PLC, Newbury, Berkshire (GB)

( * ) Notice: Subject to any disclaimer, the term of this patent is extended or adjusted under 35 U.S.C. 154(b) by 227 days.

(21) Appl. No.: 12/826,888

(22) Filed: Jun. 30, 2010

(65) Prior Publication Data

US 2010/0331004 A1     Dec. 30, 2010

(30) Foreign Application Priority Data

Jun. 30, 2009   (ES) .................................. 200930380

(51) Int. Cl.
*H04M 1/00*     (2006.01)
(52) U.S. Cl. ........ 455/574; 455/450; 375/298; 375/295; 375/220
(58) Field of Classification Search ........................ None
See application file for complete search history.

(56) References Cited

U.S. PATENT DOCUMENTS

| | | | |
|---|---|---|---|
| 7,957,482 B2* | 6/2011 | Golitschek Edler Von Elbwart et al. | ............................... 375/261 |
| 2005/0226342 A1* | 10/2005 | Alajaji et al. | .................. 375/264 |
| 2009/0067542 A1* | 3/2009 | Haartsen | ........................ 375/298 |
| 2010/0329315 A1* | 12/2010 | Sergeev et al. | ................. 375/220 |

* cited by examiner

*Primary Examiner* — Rafael Pérez-Gutiérrez
*Assistant Examiner* — German Viana Di Prisco
(74) *Attorney, Agent, or Firm* — Workman Nydegger

(57) ABSTRACT

Method and system for reducing the power consumption in mobile networks, wherein the communication between a mobile terminal and a base station is QAM modulated. The method comprises:

making the base station a dynamic real time analysis of the QAM symbols used in the communication between said mobile terminal and the base station, detecting the most frequently used QAM symbols;

obtaining the base station a new assignation of the QAM symbols for the downlink communication;

sending the base station the new assignation of the QAM symbols to the mobile terminal;

using the mobile terminal and the base station said new assignation of the QAM symbols for the demodulation process and modulation process, respectively, in their subsequent communication.

9 Claims, 3 Drawing Sheets

REDUCING POWER CONSUMPTION IN MOBILE NETWORKS

CROSS-REFERENCES AND RELATED APPLICATIONS

This application claims the benefit of the Spanish Patent Application No. ES P200930380, filed on Jun. 30, 2009, which is hereby incorporated by reference in its entirety.

FIELD

Embodiments of the present invention pertain to the field of mobile telecommunications, and more specifically to mechanisms for improving energy efficiency of mobile networks during the communication between a mobile terminal and a base station.

BACKGROUND

Part of the success of mobile broadband services is based on the usage of higher order modulation schemes (16 QAM, 32 QAM and 64 QAM in the future). The utilization of higher order modulation is so far restricted to HSPA, but can be easily extrapolated in the future to EDGE evolution and definitely to 4G. This higher order modulation schemes are different from conventional QPSK mechanism as not all symbols have the same amplitude, hence not all symbols consume same energy. This can be seen as the price to pay for increasing the amount of bits per symbol (e.g. in 8 PSK each symbol carries 3 bits, with 16 QAM number is 4 bits, 32 QAM goes up to 5 and finally with 64 QAM the amount of bits per symbol is 6).

Current mechanisms to reduce power consumption in mobile telecommunications are mainly based on reducing the amount of energy required by the hardware mechanisms (increased PA (Power Amplifier) efficiency, switch off of unused elements during idle times), but radio protocols are not considered as a mechanism to improve energy efficiency of mobile networks.

It is well-known that abbreviations and acronyms are frequently used in the mobile telephony field. Below is a glossary of acronyms/terms used throughout the present specification:

| | |
|---|---|
| 3GPP | The 3rd Generation Partnership Project |
| ETSI | European Telecommunications Standards Institute |
| GPRS | General Packet Radio Service |
| GSM | Global System for Mobile Communications |
| EDGE | Enhanced Data GSM Environment |
| MAC | Medium Access Control |
| PA | Power Amplifier |
| PSK | Phase Shift Keying |
| QAM | Quadrature Amplitude Modulation |
| QPSK | Quadrature Phase-Shift Keying |
| RLC | Radio Link Control |
| UE | User Equipment |
| UMTS | Universal Mobile Telecommunications System |

SUMMARY

Embodiments of the invention relate to systems and methods for reducing the power consumption in mobile networks.

In one example of a disclosed method the communication between a mobile terminal and a base station is QAM modulated. The method comprises, for example:

making the base station a dynamic real time analysis of the QAM symbols used in the communication between said mobile terminal and the base station, detecting the most frequently used QAM symbols;

obtaining the base station a new assignation of the QAM symbols for the downlink communication;

sending the base station the new assignation of the QAM symbols to the mobile terminal;

using the mobile terminal and the base station said new assignation of the QAM symbols for the demodulation process and modulation process, respectively, in their subsequent communication.

The new assignation of the QAM symbols can be obtained by assigning the most frequently used QAM symbols to those symbols in the QAM modulation with lower amplitude.

The dynamic real time analysis to obtain the most used QAM symbols can be carried out by:

using data already transmitted between the mobile phone and the base station (normally, the last data transmitted in the last x seconds), or using data to be transmitted between the mobile phone and the base station (e.g., the data stored in the transmission buffer), or using data already transmitted and data to be transmitted between the mobile phone and the base station.

In one embodiment, the method also comprises sending the base station to the mobile terminal, together with the new assignation of the QAM symbols, the amount of information using said new assignation.

The dynamic real time analysis to obtain the most used QAM symbols is, in a disclosed example, carried out for the downlink communication, detecting this way the most frequently used QAM symbols in the downlink communication.

The new assignation of the QAM symbols is preferably expressed via a conversion matrix.

In another disclosed embodiment, a system for reducing the power consumption in mobile networks comprises, for example:

the base station, which in turn comprises data processing means configured to:

make a dynamic real time analysis of the QAM symbols used in the communication between said mobile terminal and the base station, detecting the most frequently used QAM symbols; and obtain a new assignation of the QAM symbols; the base station being configured to:

send the new assignation of the QAM symbols to the mobile terminal, and use said new assignation of the QAM symbols for the modulation process in the subsequent communication with the mobile terminal;

the mobile terminal, being configured to use said new assignation of the QAM symbols for the demodulation process in the subsequent communication with the base station.

The data processing means of the base station can be configured to obtain the new assignation of the QAM symbols by assigning the most frequently used QAM symbols to those symbols in the QAM modulation with lower amplitude or with higher amplitude.

The data processing means of the base station can be configured to obtain the most used QAM symbols in the dynamic real time analysis by:

using data already transmitted between the mobile phone and the base station;

using data to be transmitted between the mobile phone and the base station;

using data already transmitted and data to be transmitted between the mobile phone and the base station.

The base station can be further configured to send to the mobile terminal, together with the new assignation of the QAM symbols, the amount of information using said new assignation.

BRIEF DESCRIPTION OF THE DRAWINGS

A series of drawings which aid in better understanding the invention and which are expressly related with an embodiment of said invention, presented as a non-limiting example thereof, are very briefly described below.

DESCRIPTION OF EXAMPLE EMBODIMENTS

In digital communication not all combination of bits is equally probable. As an example, GSM standard establishes that whenever there is nothing to send within a particular message, it is filled in with the 2B octet (or in binary 00101011). If using a 16 QAM modulation, the symbols for 0010 and for 1011 would be much more likely than others. In a general communication, it is possible to make a dynamic real time analysis of the most used symbols (sequence of bits) in the previous frames, that would give a guidance of the most probable future symbols (sequence of bits).

The solution proposed consists of a combination of the above dynamic real time analysis plus a dynamic table with symbols and bits sequence, shared periodically between the UE and the network. Hence the symbol would not be statically connected to a bit string, but would be dynamically allocated. By doing this, it is possible to allocate the most likely bit strings within a communication to those symbols that have less amplitude (less energy), hence providing less power consumption.

This would provide a side benefit in terms of interference, improving the overall system capacity. Dynamic allocation of bit strings with symbols, in combination with the analysis of the more likely strings to reduce the overall energy consumption of the system is a novel approach in telecom systems.

Figure 1:
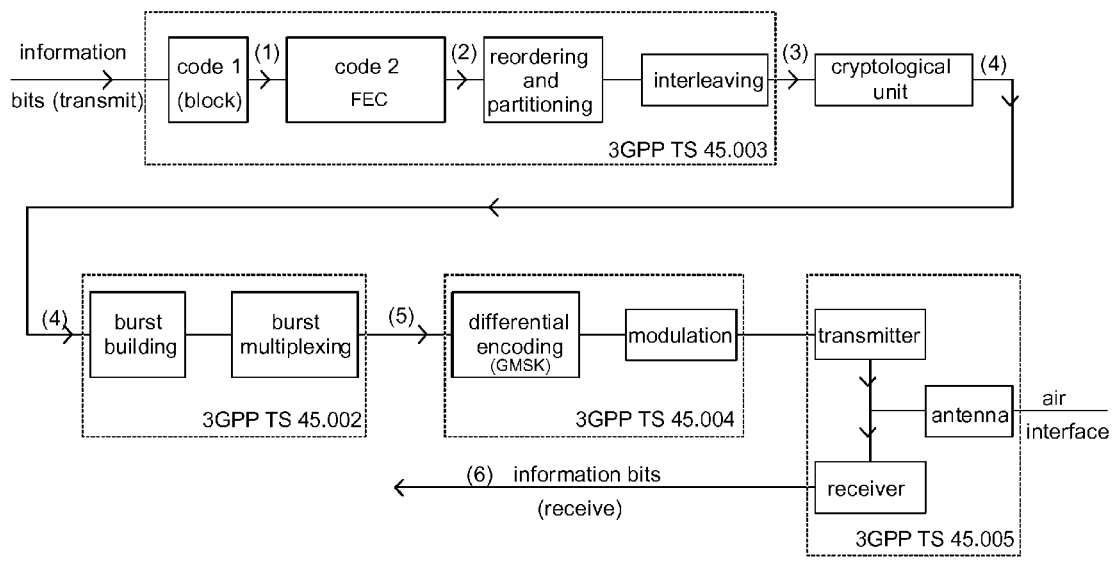
FIG. 1 shows the building block of physical layer functions.

In EDGE evolution new modulation schemes will be introduced in order to improve the overall performance in the system. These modulations are QAM modulations which consist in different amplitudes and phases, while the previous modulations were just phase shifting modulations. The building block of physical layer functions is shown in FIG. 1, using the following references: 1 for the info+parity bits, 2 for the coded bits, 3 for the interleaved bits, 4 for the encrypted bits, 5 for the modulating bits, 6 for the information bits (receive).

Modulation is done in the last part of the transmitting chain, in the physical layer of the RF link. Modulation is defined in the standard in 44.004 document.

Information is sent in a bitstream format to the physical layer by RLC/MAC (Described in 3GPP 44.060), which are layer 2 protocol.

Before modulation, RLC layer pass the bit stream to physical layer, and then the physical layer finish the process of channel coding, adding tail bit and training sequence, separate in different timeslots and finally generate another bit stream which is going to be modulated. Then the bit stream is mapped into symbol, depending on the modulation technical adopted, several bits will mapped into a symbol (e.g. GMSK modulation, 1 bit will map 1 symbol; 16 QAM modulation, 4 bits will map 1 symbol), and the mapping or transformation relationship between bits and symbol is static: once the symbol's position in constellation is confirmed, then the mapping relationship is confirmed.

Figure 2:
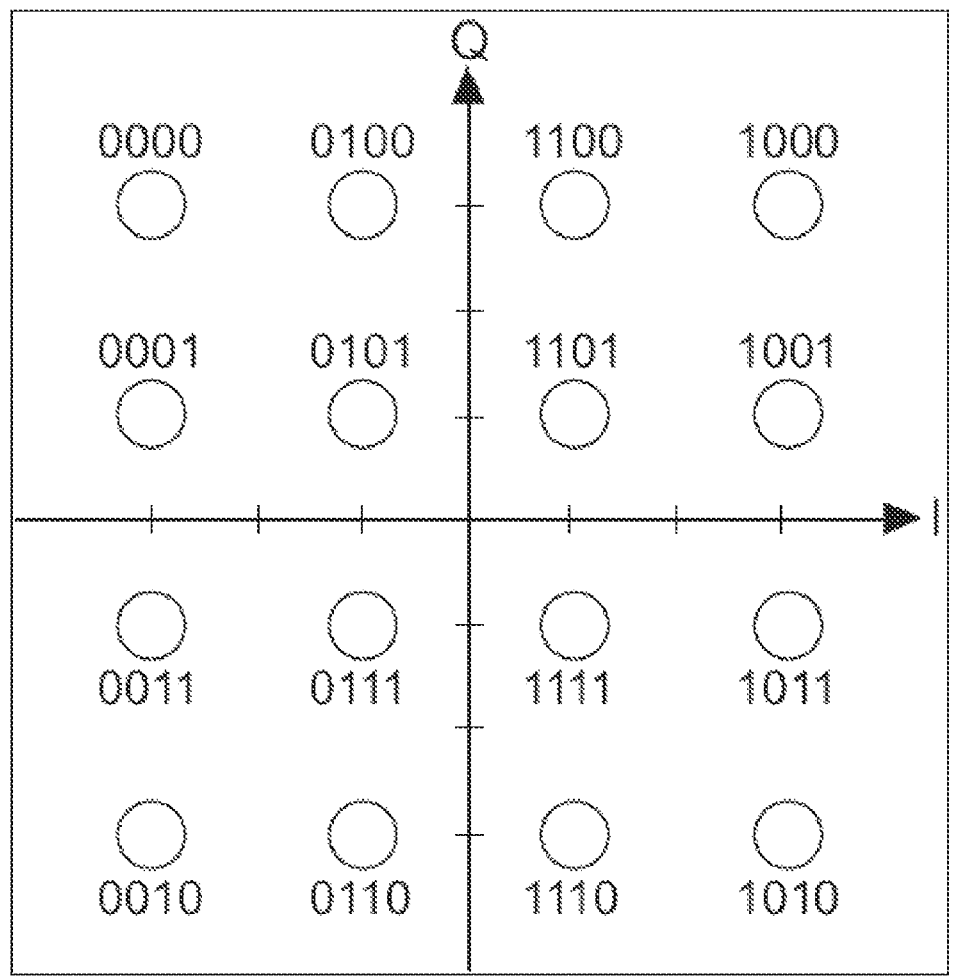
FIG. 2 shows a modulation constellation diagram for rectangular 16-QAM used in GSM.

QAM modulations are usually depicted in a constellation-like representation, representing amplitude and phase. In FIG. 2 is represented a modulation constellation diagram for rectangular 16-QAM used in GSM, which are rectangular constellations.

In these constellations we can distinguish between outer symbols and inner symbols:

Outer symbols are the ones in the outer part of the constellation (in FIG. 2 there are 12 outer symbols). They have bigger amplitude and therefore the PAR (Peak average ratio) will be higher. However, as they do not have a lot of symbols around, the uncertainty is lower and it is easier to transmit and receive those symbols.

Inner symbols are the ones in the inner part of the constellation (in FIG. 2 there are 2 inner symbols). They have lower amplitude and therefore the PAR (Peak Average Ratio) will be lower. However, since they have a lot of symbols around the uncertainty is big and it is more difficult to receive those symbols.

Therefore there are two kinds of symbols with some advantages and disadvantages:

High PAR require some power backoff in the PA and the power efficiency will be worst than with lower PAR.

High symbol receiving uncertainty, creates a higher number of errors in the symbol detection, reducing the performance of the system, especially regarding throughput and latency.

As it has been described there are different symbol types in QAM modulations with different advantages. Right now there is static mapping to symbols (3GPP 44.004) so the distribution in the long term will probably be equal.

The present invention proposes to include a new function in the modulation/demodulation processes to allow to make some symbols (inner or outer) more common and therefore gain the advantages that are described previously.

These functions can be called modulation scrambler/descrambler and will find bits to symbol mapping that follow the operator strategy. This allocation will be done per user.

In GSM systems information is sent to the different protocols defined in the standard. Last one before the bits are modulated is the RLC one. RLC has one buffer where information to be sent in the downlink is stored. Before information is prepared to be sent the new scrambler function will calculate which are the symbols that will occur more often in that bit sequence. Those symbols will be ordered according to operator's preference and will be allocated a new bitstream.

This scrambler function should be configurable by the operator where a parameter with at least the following three values should be provided:

1—Outer symbols favored.
2—Inner Symbols favored.
3—No symbols favored.

Descrambler in the user device will receive this message and will apply this conversion matrix to the information to be received. If there is no message received after the amount of information has expired, then no scrambling shall be done.

Figure 3:
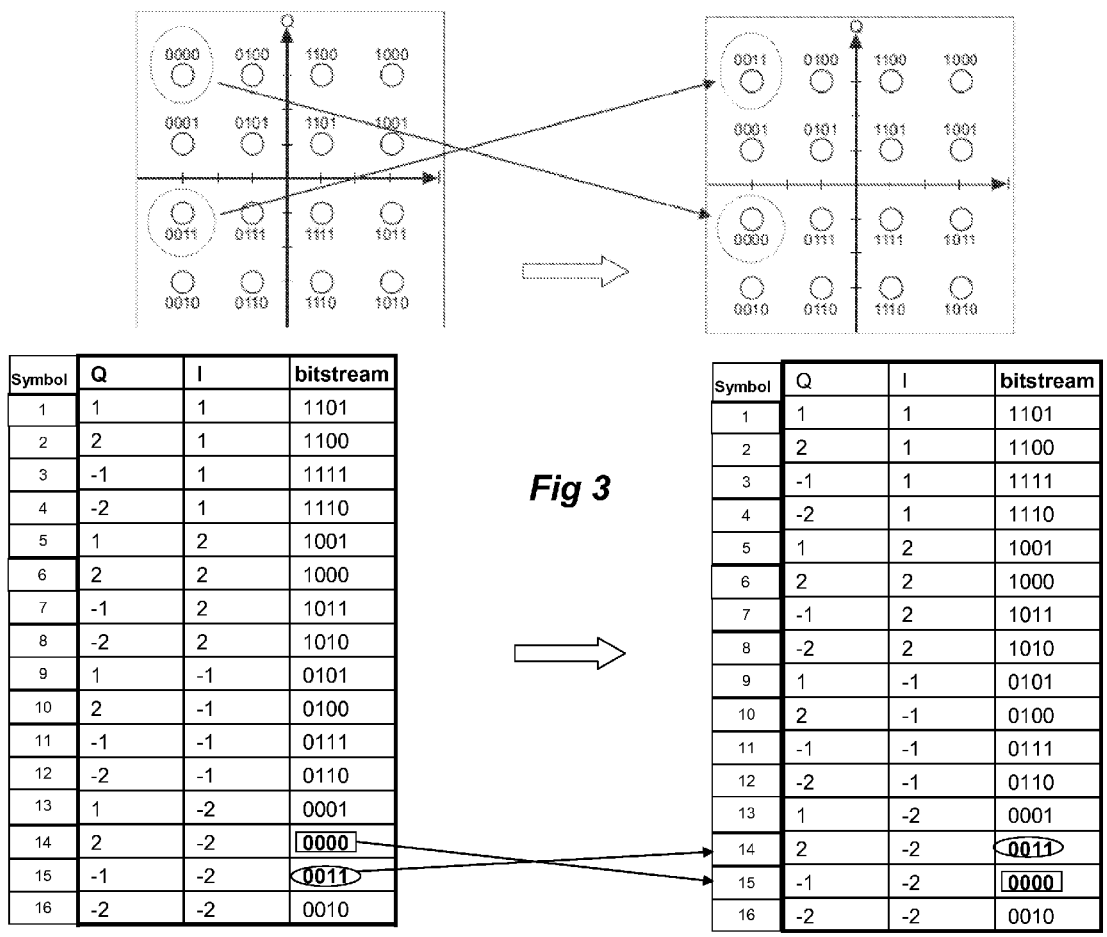
FIG. 3 shows an example of a new assignation of the QAM symbols according to the invention.

Before sending the information to the user in the downlink, a new message will be sent in order to indicate the new scrambling mode to be used. That message will be divided in two parts:

1—Conversion matrix, where each symbol in the constellation will be allocated a new bitstream. Reference can be the static allocation already in use right now. In FIG. 3 it is shown an example with 16QAM (16 symbols), aimed to understand the conversion matrix, in which only symbols 14 and 15 change. The conversion matrix in this example could be expressed as:

1, 2, 3, 4, 5, 6, 7, 8, 9, 10, 11, 12, 13, 15, 14, 16

These data represent that the new bitstream for symbol 1 (Q=1, I=1) is the previous bitstream for said symbol 1, that is, '1101'; the new bitstream for symbol 2 (Q=2, I=1) is the previous bitstream for said symbol 2, that is, '1100'; . . . ; the new bitstream for symbol 14 (Q=2, I=−2) is the previous bitstream for the symbol 15, that is, '0011'; the new bitstream for symbol 15 (Q=−1, I=−2) is the previous bitstream for the symbol 14, that is, '0000'; the new bitstream for symbol 16 (Q=−2, I=−2) is the previous bitstream for said symbol 16, that is, '0010'.

In this example if the bitstream '0000' is most frequently used then it would be expressed as Q=−1, I=−2 (instead of the former symbol Q=2, I=−2) and thus saving energy since the new symbol has lower amplitude.

The information regarding the conversion matrix can be transmitted in many other different ways (e.g., transmitting the whole conversion matrix including all rows and columns), provided it is clear which conversion is to be applied in the demodulation process.

2—Amount of information that will use that conversion matrix.

This message will be sent in the signaling channel that is allocated to the user.

Since the different signals used in the mobile networks will be QAM modulated, the different codes will have different amplitudes, and thus representing different power levels. The symbol assigned to an absent signal can instead be replaced, according with the present invention, by a symbol of lower amplitude dynamically.

The invention claimed is:

1. A method for reducing the power consumption in mobile networks, wherein the communication between a mobile terminal and a base station is QAM modulated, the method comprising:
   making the base station a dynamic real time analysis of the QAM symbols used in the communication between said mobile terminal and the base station by using data already transmitted and data to be transmitted between the mobile phone and the base station, detecting the most frequently used QAM symbols;
   obtaining the base station a new assignation of the QAM symbols for the downlink communication;
   sending the base station the new assignation of the QAM symbols to the mobile terminal; and
   using the mobile terminal and the base station said new assignation of the QAM symbols for the demodulation process and modulation process, respectively, in their subsequent communication.

2. The method according to claim 1, wherein the new assignation of the QAM symbols is obtained by assigning the most frequently used QAM symbols to those symbols in the QAM modulation with lower amplitude.

3. The method according to claim 1, wherein it also comprises sending the base station to the mobile terminal, together with the new assignation of the QAM symbols, the amount of information using said new assignation.

4. The method according to claim 1, wherein the dynamic real time analysis to obtain the most used QAM symbols is carried out for the downlink communication, detecting this way the most frequently used QAM symbols in the downlink communication.

5. The method according to claim 1, wherein the new assignation of the QAM symbols is expressed via a conversion matrix.

6. A system for reducing the power consumption in mobile networks, wherein the communication between a mobile terminal and a base station is QAM modulated, the system comprising:
   the base station, which in turn comprises data processing means configured to:
      make a dynamic real time analysis of the QAM symbols used in the communication between said mobile terminal and the base station by using data already transmitted and data to be transmitted between the mobile phone and the base station, detecting the most frequently used QAM symbols; and
      obtain a new assignation of the QAM symbols;
   the base station being configured to:
      send the new assignation of the QAM symbols to the mobile terminal, and
      use said new assignation of the QAM symbols for the modulation process in the subsequent communication with the mobile terminal;
   the mobile terminal, being configured to use said new assignation of the QAM symbols for the demodulation process in the subsequent communication with the base station.

7. The system according to claim 6, wherein the data processing means of the base station are configured to obtain the new assignation of the QAM symbols by assigning the most frequently used QAM symbols to those symbols in the QAM modulation with lower amplitude.

8. The system according to claim 6, wherein the data processing means of the base station are configured to obtain the new assignation of the QAM symbols by assigning the most frequently used QAM symbols to those symbols in the QAM modulation with higher amplitude.

9. The system according to claim 6, wherein the base station is further configured to send to the mobile terminal, together with the new assignation of the QAM symbols, the amount of information using said new assignation.

\* \* \* \* \*